(12) United States Patent
Jain et al.

(10) Patent No.: US 11,847,396 B1
(45) Date of Patent: Dec. 19, 2023

(54) INTEGRATED CIRCUIT DESIGN USING MULTI-BIT COMBINATIONAL CELLS

(71) Applicant: Synopsys, Inc., Mountain View, CA (US)

(72) Inventors: Mayank Jain, Mississauga (CA); Deepak Dattatraya Sherlekar, Cupertino, CA (US); Mohammad Ziaullah Khan, Folsom, CA (US); Guilherme Augusto Flach, Hillsboro, OR (US); Linuo Xue, Mountain View, CA (US); Jeff Ku, Mountain View, CA (US); Jovanka Ciric Vujkovic, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 238 days.

(21) Appl. No.: 17/393,869

(22) Filed: Aug. 4, 2021

Related U.S. Application Data

(60) Provisional application No. 63/061,638, filed on Aug. 5, 2020.

(51) Int. Cl.
*G06F 30/392* (2020.01)
*G06F 30/327* (2020.01)
*G06F 111/04* (2020.01)

(52) U.S. Cl.
CPC .......... *G06F 30/392* (2020.01); *G06F 30/327* (2020.01); *G06F 2111/04* (2020.01)

(58) Field of Classification Search
USPC ........................................................ 716/105
See application file for complete search history.

(56) References Cited

U.S. PATENT DOCUMENTS

| | | | | |
|---|---|---|---|---|
| 9,652,573 | B1 * | 5/2017 | Odiz | G06F 30/327 |
| 9,690,890 | B1 * | 6/2017 | Odiz | G06F 30/327 |
| 9,697,314 | B1 * | 7/2017 | Odiz | G06F 30/34 |
| 2018/0107777 | A1 * | 4/2018 | Odiz | G06F 30/327 |
| 2018/0107779 | A1 * | 4/2018 | Zepter | G06F 1/10 |

* cited by examiner

*Primary Examiner* — Mohammed Alam
(74) *Attorney, Agent, or Firm* — Patterson + Sheridan, LLP

(57) ABSTRACT

Embodiments herein describe a techniques for identifying a first combinational cell 210 in a design for an integrated circuit, identifying a plurality of candidate combinational cells 205 to combine with the first combinational cell using a first criterion. The techniques also include combining the first combinational cell with at least one of the plurality of candidate combinational cells to form a multi-bit (MB) combinational cell 100. Upon determining the MB combinational cell satisfies a performance threshold, the first combinational cell and the at least one of the plurality of candidate combinational cells are replaced with the MB combinational cell in the design.

20 Claims, 8 Drawing Sheets

INTEGRATED CIRCUIT DESIGN USING MULTI-BIT COMBINATIONAL CELLS

RELATED APPLICATION

This application claims the benefit of provisional patent application 63/061,638, filed on Aug. 5, 2020, which is incorporated herein by reference in its entirety.

TECHNICAL FIELD

The present disclosure relates to combining single-bit (SB) combinational cells in a circuit design to form multi-bit (MB) combinational cells.

BACKGROUND

MB sequential cells (e.g., registers, flip flops or other types of memory elements) are known technology for reducing area and power consumption in a design. These solutions do not consider MB combinational cells (e.g., NORs, ORs, ANDS, NANDs, inverters, multiplexers, and the like) but instead focus solely on combining sequential cells into MB sequential cells.

A combinational cell is a cell in a design of an integrated circuit that implements a combinational logic function related to a Boolean expression. Unlike a sequential cell, a combinational cell does not have a concept of a clock. Further, a combinational cell performs a computation while sequential cells are used to store intermediate results of a computation, but do not perform a logical function (e.g., a Boolean expression).

SUMMARY

One embodiment described herein is non-transitory computer readable medium comprising stored instructions, which when executed by a processor, cause the processor to perform an operation, the operation includes identifying a first combinational cell in a design for an integrated circuit, identifying a plurality of candidate combinational cells to combine with the first combinational cell using a first criterion, combining the first combinational cell with at least one of the plurality of candidate combinational cells to form a MB combinational cell, and, upon determining the MB combinational cell satisfies a performance threshold, replacing the first combinational cell and the at least one of the plurality of candidate combinational cells with the MB combinational cell in the design.

Another embodiment includes determining that each of the plurality of candidate combinational cells is within a first distance from the root combinational cell in a placement of the design where the first distance corresponds to a search window centered at the first combinational cell.

Another embodiment includes determining that each of the plurality of candidate combinational cells has a shared input signal with the first combinational cell.

Another embodiment includes identifying the plurality of candidate combinational cells based on graph clustering where combinational cells within the same cluster as the first combinational cell form the plurality of candidate combinational cells.

Another embodiment includes determining the MB combinational cell satisfies the performance threshold based on whether global congestion in a region of the integrated circuit containing the MB combinational cell is degraded when replacing the first combinational cell and the at least one of the plurality of candidate combinational cells with the MB combinational cell in the design.

Another embodiment includes determining that each of the plurality of candidate combinational cells is on a same signal bus as the first combinational cell.

Another embodiment includes, before replacing the first combinational cell and the at least one of the plurality of candidate combinational cells with the MB combinational 6954860-2 cell, sizing the MB combinational cell and adjusting a drive strength and threshold-voltage of the MB combinational cell.

In another embodiment, the performance threshold corresponds to a threshold related to at least one of area, power, or timing corresponding to the MB combinational cell.

In another embodiment, the first combinational cell and the at least one of the plurality of candidate combinational cells are a same type of single-bit combinational cell.

In another embodiment, the first combinational cell and the at least one of the plurality of candidate combinational cells are different types of single-bit combinational cell.

Another embodiment includes, after replacing the first combinational cell and the at least one of the plurality of candidate combinational cells with the MB combinational cell and upon identifying the MB combinational cell has a significant constraint on synthesizing the design according to a threshold, decomposing the MB combinational cell to determine whether doing so improves the design.

Another embodiment includes, before replacing the first combinational cell and the at least one of the plurality of candidate combinational cells with the MB combinational cell, adding an unused single-bit combinational cell to the MB combinational cell to serve as a spare cell, where the MB combinational cell, after being placed, comprises the first combinational cell, the at least one of the plurality of candidate combinational cells, and the unused single-bit combinational cell.

Another embodiment includes after replacing the first combinational cell and the at least one of the plurality of candidate combinational cells with the MB combinational cell, assigning the spare cell in the MB combinational cell to perform a logical function in the design in response to an engineering change order (ECO).

One embodiment described herein is a system that includes a memory storing instructions and a processor, coupled with the memory and to execute the instructions, the instructions when executed cause the processor to perform an operation. The operation includes identifying a plurality of candidate SB combinational cells to combine into a MB combinational cell in a design for an integrated circuit, selecting, based on environmental conditions in the design, an implementation of the MB combinational cell from a collection of functionally equivalent MB cells with different area, power, or performance characteristic, and, upon determining that the selected implementation of the MB combinational cell satisfies a performance threshold, replacing the plurality of SB combinational cells with the selected implementation of the combinational MB cell.

In one embodiment, the functionally equivalent MB cells all perform the same perform the same Boolean logic.

In one embodiment, the performance threshold corresponds to a threshold related to at least one of area, power, or timing corresponding to the MB combinational cell.

Another embodiment includes, before replacing the plurality of SB combinational cells with the selected implementation of the combinational MB cell, adding an unused SB combinational cell to the MB combinational cell to serve as a spare cell where the MB combinational cell, after being placed, includes the plurality of SB candidate combinational cells and the unused SB combinational cell.

One embodiment described herein is a method that includes identifying a first SB combinational cell in a design for an integrated circuit, wherein the first combinational cell is a first type of combinational cell, identifying a second SB combinational cell in the design, wherein the second combinational cell is a second type of combinational cell, combining the first and second SB combinational cells to form a MB combinational cell, and, upon determining the MB combinational cell satisfies a performance threshold, replacing the first and second SB combinational cells with the MB combinational cell in the design.

In one embodiment, the first and second SB combinational cells perform different Boolean logic.

In one embodiment, the performance threshold corresponds to a threshold related to at least one of area, power, or timing corresponding to the MB combinational cell.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

DETAILED DESCRIPTION

Figure 1:
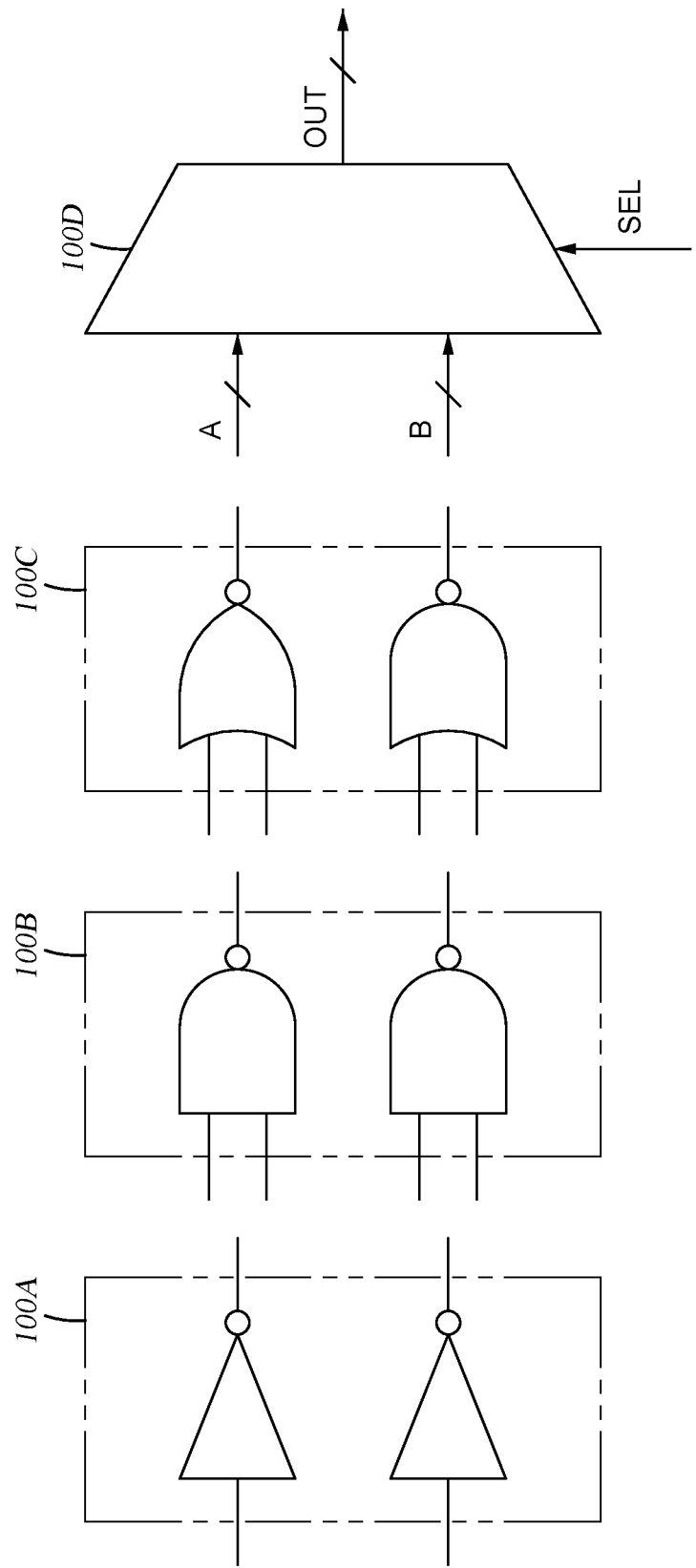
FIG. 1 illustrates MB combinational cells, according to embodiments of the present disclosure.

The embodiments herein form MB combinational cells from single-bit (SB) combinational cells for reducing the design area, power consumption (due to shared circuitry), or both. As discussed above, MB sequential cells have been in use for some time to help improve power consumption in digital designs. The embodiments herein enable the use of MB combinational cells to improve area and power consumption of a design. Typically, there are many more combinational cells than sequential cells in a design which means there are more opportunities to substitute SB combinational cells with their MB equivalent.

MB combinational cells can have shared circuitry and/or layout features, thus providing area and power consumption benefit relative to dividing the MB combinational cell into separate SB combinational cells. MB combinational cells may also provide performance benefits. Unlike the sequential MB cells where there is some common theme, such as a same clock signal or bits of the same bus, the bits in MB combinational cells can be independent with nothing in common (except the same voltage domain). This additional flexibility of combining multiple independent SB combinational cells into a single combinational MB cell also presents some challenges such as determining suitable SB candidate cells for merging into a MB cell. In one embodiment, a synthesis process considers compatible cells for merging based on proximity to each other. The proximity requirement may be optionally specified by a window, so that cells placed within the window are candidates for merging into a MB combinational cell. The size of the window can be varied to meet the specific needs of the design block, and may be a user-specified parameter. This alleviates the issues that may arise when attempting to merge two (or more) cells that may be far apart which can negatively impacting timing or power goals.

The MB cells are created by grouping two or more SB combinational cells that can have some shared circuitry or layout features. Examples of MB combinational cells sharing layout features include two or more (in general, N number of) combinational cells such as NOR, OR, AND, AO, INV etc. cells packed into a MB cell with a smaller layout footprint. An example of a MB cell sharing common circuitry is a MB MUX cell, which has a shared select logic which can improve leakage and internal power. In one embodiment, area and power consumption benefits are also be obtained when combining different types of SB combinational cells into their MB combinational cell equivalent such as an inverter and a NOR, or a NAND and a NOR.

Embodiments herein describe algorithms to search and selectively merge two or more SB combinational cells into a MB combinational cell. The searching for mergeable combinational cells can be accomplished by different methods including physical proximity, structural proximity, shared logic, etc. A merging of combinational cells is accepted whenever it brings some benefit like area reduction or reduced power consumption while preserving (or permitting a small degradation) of other metrics like timing and power. The algorithms also enable decomposing MB combinational cells into SB cells (or smaller MB cells) if such transformations bring benefits such as improvement in timing, area, power, placement, or sizing.

In one embodiment, MB combinational cells with unused bits can be used opportunistically to provide a spare cell for anticipated netlist changes downstream from the initial MB mapping flow and lessen the perturbation on placement and legalization in implementing those netlist changes to provide better design convergence. That is, many designs make use of spare cells for post tape-out correction of errors in the chip or for late stage engineering change order (ECO). Implementing spare cells with unmapped bits in MB cells reduces the footprint of these spare cells, enabling smaller die size or larger number of spare cells for the same area. While unused bits can be added to two SB combinational cells that have been combined into a MB combinational cell, in another embodiment, a SB combinational cell can be mapped to a 2-bit combinational cell where the other bit is a spare, or a 3-bit combinational cell that has one or two unused bits serving as spare cell(s).

Additional non-limiting benefits in certain process technologies is that MB cells can also offer timing benefits and the embodiments herein can consider timing and power constraints when making merging decisions so an unsuitable selection of merging candidates is rejected to prevent any degradation of timing or power goals. Further, the embodiments herein can address any local or global congestion issues arising out of merging to make sure the design's routability is not negatively impacted. The area and, in some cases, timing improvements help achieve higher performance in smaller die area that helps reduce the overall cost of the design. Further, the embodiments herein can be integrated into a compiler and design tools (e.g. software design applications) which makes it convenient to take advantage of the disclosed embodiments in an existing design implementation flow.

FIG. 1 illustrates MB combinational cells 100 that include a MB combinational cell 100A formed using two invertors, a MB combinational cell 100B formed using two NAND gates, a MB combinational cell 100C formed using two NOR gates, and a MB combinational cell 100D that includes a 2-input multi-bit multiplexor where A and B are each multiple input bits. Most MB combinational cells do not share logic, but some do like the 2-input multi-bit multiplexor. Their primary benefit is area, which comes from the ability to create a more compact layout. In many processes, MB combinational cells also offer higher performance. While FIG. 1 illustrates MB combinational cells 100A-100C that include the same type of SB combinational cells, the embodiments herein can be used to combine different types of SB combinational cells into a MB combinational cells such as an inverter and a NOR, or a NAND and a NOR.

Figure 2:
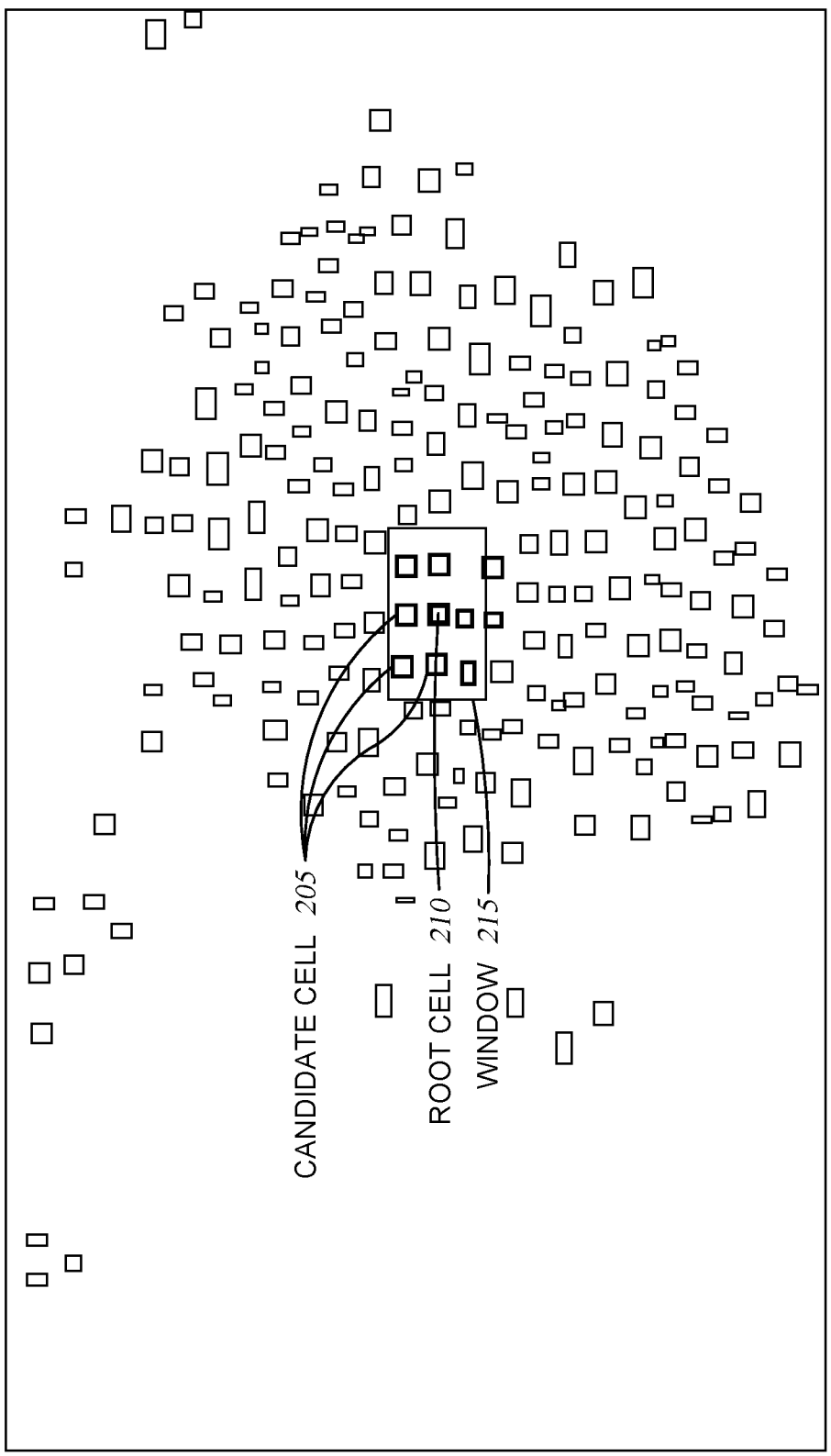
FIG. 2 illustrates identifying candidate combinational cells to combine with a root combinational cell, according to embodiments of the present disclosure.

FIG. 2 illustrates identifying candidate combinational cells to combine with a root combinational cell, according to embodiments of the present disclosure. FIG. 2 illustrates a layout of design of an integrated circuit. A root cell 210 (e.g., a SB combinational cell) has been selected. Further, a compiler (which is described in detail in FIG. 7) can identify a search window 215 centered at the root cell 210 and is used to identify a group of candidate cells 205 as described below.

Figure 3:
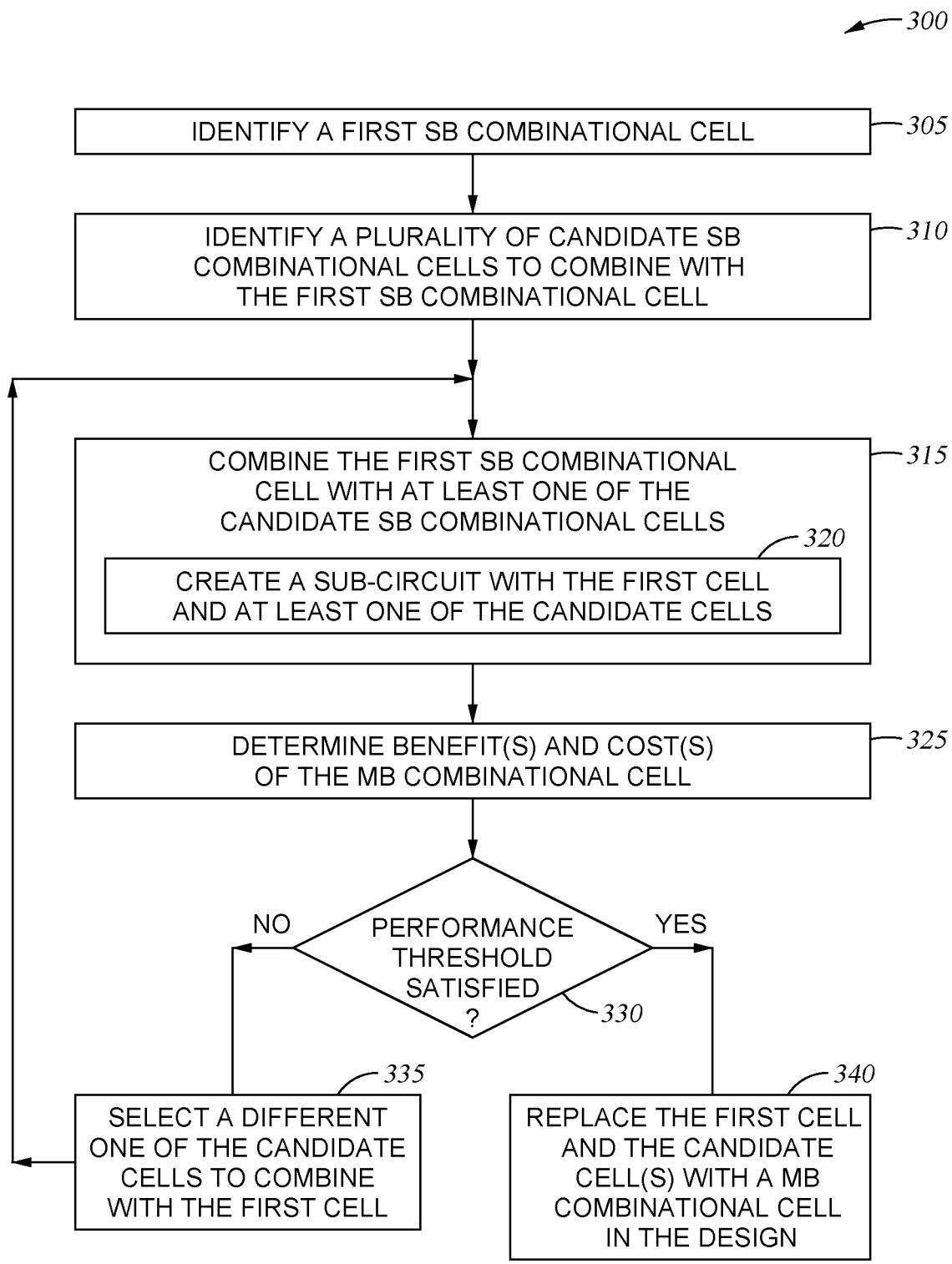
FIG. 3 illustrates a flowchart for combining a SB combinational cell with a candidate SB combinational cell, according to embodiments of the present disclosure.

FIG. 3 illustrates a flowchart of a method 300 for combining a first SB combinational cell with one or more candidate SB combinational cell, according to embodiments of the present disclosure. The various blocks in the method 300 can occur during many different times during synthesis of a design for an integrated circuit. That is, the method 300 can be performed during all phases of a digital implementation flow. Examples include (but are not limited to) before and during initial mapping, before or after placement, restructuring, remapping, and when buffering long nets.

At block 305, a compiler identifies a first SB combinational cell. In one embodiment, the first SB combinational cell is the root cell 210 in FIG. 2.

At block 310, the compiler identifies a candidate SB combinational cell or cells to combine with the first SB combinational cell. If the method 300 is performed during or after the combinational cells in the design have been placed, placement information is used to decide whether to combine or merge multiple cells as a MB cell. In this embodiment, only cells that are placed close to each other in the same design hierarchy are qualified to merge (i.e., candidate combinational cells). This can be achieved by querying cells in the design that are placed nearby within an m×m search window (e.g., the search window 215 in FIG. 2) where m is a tunable parameter, and then sorting these cells based on physical distance. There can be large number of potential combinations of cells (e.g., candidate cells) that can be combined to form MB cells. The compiler can try all possible combinations to see which give best area, power, and/or timing gain, or can prioritize the combination based on size of the MB cell, physical distance, signal connectivity, drive strength, area, or leakage.

Combining two or more cells that are far apart into a single MB cell can, in certain cases, have negative timing impact. The compiler can mitigate this by defining a variable search window that controls which cells are candidates for merging into an MB combinational cell.

In one embodiment, rather than using physical distance as a criterion to identify candidate SB combinational cells to merge, some cells can have shared input signals (e.g. a MB mux will have a shared select pin) which can be used as the criterion to identify candidate combinational cells. This technique can be used before placement has been performed on the design. For example, during or after an initial mapping stage, the compiler may have connected the cells, and thus, can identify shared input signals. For example, the compiler can identify multiple SB combinational cells with a shared input signal to combine to form a MB combinational cell. This technique can be applied during initial mapping as well as later during incremental mapping (pre-placement and post-placement).

In another embodiment, candidate cells can be identified using graph clustering. Graph clustering techniques are an alternative to finding cells "close to each other" like using the strategy in FIG. 2 without needing placement information. That is, cells inside clusters tend to be placed closer to each other, hence, cells inside the same cluster of a graph can be a criterion used to identify candidate SB combinational cells to combine. Further, graph clustering can occur before the cells are placed, so this technique could be done before placement.

In another embodiment, a common bus can be another criterion used to identify candidate cells to combine. Cells that are on the same signal bus can be merged to form a MB cell based on signal connectivity. The compiler can combine SB cells that are connected to each other (e.g. the SB cells have the same driver signal, or one cell drives the other cell) to form a MC cell using method 300.

Further, the method 300 can be used when an initial circuit is decomposed into a gate independent representation such as a AND-Inverter Graph, OR-Inverter Graph, binary decision diagrams, sum of product representations, or product of sums representations. The compiler use the method 300 directly on these representations, rather than waiting later in the synthesis process such as initial mapping or placement. In general, the optimization techniques in method 300 can be done before initial mapping, during a logic optimization phase, during initial mapping but before placement, or can done during and after placement.

At block 315, the compiler combines the first SB combinational cell with at least one of the candidate SB combinational cells to form a MB combinational cell. Because the method 300 can occur during different times in the synthesis flow, the SB combinational cells may have not yet been a mapped standard cell but can include any gate independent representation of a logic function such as an AND, OR, or XOR logic function in the circuit.

The first SB cell can be combined with one, two, three, four, etc. other candidate SB combinational cells to form the MB combinational cell. Four example, the compiler may merge the first cell with another SB cell to form a 2-bit MB combinational cell. Alternatively, the compiler may merge the first cell with two other candidate SB cells to form a 3-bit MB combinational cell. Thus the MB combinational cell can be a combination of N number SB cells where N is two or more.

In one embodiment, the MB combinational cells are defined in a database (e.g., a cell library). Depending on the number of SB cells being combined, the compiler can select from the database the MB cell that is functionally equivalent to the SB cells. Thus, combining multiple SB cells into a single MB cell does not change the underlying computation or logic of the design.

A one-to-one mapping of the function of SB cells to bits of a MB cell is not required. The SB cells can be mapped to different function types of a MB cell. For example, two SB AND2 gates can be merged to a 2-bit NAND2 and 2-bit INV MB gates such that the resulting logic is functionally equivalent to the original circuit. Further, SB cells can also be decomposed to simpler gates or combined with other gates in multiple ways to identify a MB cell. One example is a buffer gate that can be decomposed to two SB inverters and merged into a 2-bit MB inverter gate, or a AND3 gate can be merged into a 2-bit MB AND2 gate.

In one embodiment, the MB cells are allocated unused bits instead of the compiler leaving spare cells in the design. Put differently, the compiler can form MB cells with unused bits as an alternative to having spare SB cells in the design. Implementing spare cells with unmapped bits in MB cells reduces their footprint, enabling smaller die size or larger number of spare cells for the same area. That is, when combining the combinational cells, the compiler may add additional, unused SB combinational cells to the MB combinational cells to serve as spare cells. Later in the implementation flow, the unused cells may be assigned to perform a logical function in the design, e.g., to fulfill an ECO. If never assigned, the unused bits in the MB cells may remain disconnected from the remaining circuitry.

As part of forming the MB cell, in one embodiment at block 320 the compiler creates a sub-circuit with the first cell and the at least one candidate cell. The compiler may carve out of the netlist of the design the portion that has these cells. This portion can then be replaced by the MB cell. Creating sub-circuits for each proposed combination can help to parallelize the method 300 so that multiple potential combinations of SB cells can be considered simultaneously by the compiler. However, creating sub-circuits from the combination of the cells is not a requirement.

After a MB combinational cell is created, it can be placed at the center of the cells being combined or the placement can be biased to favor the critical bit. A legalizer (e.g., a software module in the compiler or a separate software application) can be called to get a legal location—e.g., ensure the MB combinational cell does not overlap any other cells in the design.

At block 325, the compiler determines one or more benefits and costs of the MB combinational cell relative to maintaining the SB cells as separate cells. As mentioned above, MB combinational cells can have shared circuitry and/or layout features which provide area and power consumption benefits (e.g., smaller layout footprint, less leakage, less internal power) relative to dividing the MB combinational cell into separate SB combinational cells. For example, placing two separate SB cells in a design may require more space or more power than replacing those cells with a single MB cell that has the same logical function. The compiler can identify whether these benefits are achieved, and quantify the benefits for a particular combination.

On the other hand, the compiler can also identify the costs (if any) of replacing multiple SB combinational cells with a single MB combinational cell. For example, the MB combinational cell may have a negative impact on timing since a SB cell at one location in the design may be replaced by a MB cell at a different location in the design which can harm (or improve) timing. Replacing the SB cells with a MB cell can also increase power consumption. By identifying the benefits and costs of replacing the SB cells with a MB cell, the compiler can determine whether to proceed with the merger, or to keep the SB cells as separate cells in the design.

At block 330, the compiler determines whether a performance threshold is satisfied. The performance threshold may be whether the benefits outweigh the costs. The compiler can cost (e.g., evaluate) the new solution for area and timing and accept the merger if it improves area while preserving timing. In one embodiment, the area, power, timing or other performance parameter of the resulting MB cell is evaluated to decide whether to accept the mapping or revert to the state before the mapping. For example, the compiler can determine whether the benefits of combining the SB cells (e.g., a reduction in area) outweigh the costs of doing so (e.g., an increase in power consumption).

In another embodiment, the performance threshold may stipulate that the benefits should outweigh the costs by a certain percentage before the merger is accepted. In yet another embodiment, the performance threshold may indicate that the improvement in area reduction has to exceed a certain percentage, or that the cost (e.g., increased power consumption or timing degradation) cannot exceed a certain percentage, or some combination thereof.

If the final placement of the MB cell causes unacceptable degradation in timing, the combination of the SB cells can be rejected if the MB cell is a 2-bit MB cell. However, if the MB cell is greater than 2-bits, the MB cell could be shrunk to a smaller MB cell by removing the degraded bit so that timing is met. That is, the compiler can attempt to change the MB cell to see if the performance threshold can be satisfied such as reducing the size of the MB cell to determine whether a smaller MB cell satisfies the performance threshold (e.g., a minimum timing). Alternatively or additionally, the compiler could try moving the MB cell to different locations to favor critical bits in hopes this means the timing is satisfied.

When placing the SB cells to relieve local congestion, the compiler may pad one or more SB cell edges with white space to address pin access contention. The compiler may also provide padding to the MB cell. In this example, the compiler may have a performance threshold that requires a certain padding around the MB cell. For example, a MB cell is accepted if the padded edge is also an edge in the MB cell and padding is applied to that MB cell edge. However, the threshold is not met if the padded edge is not an edge in the MB cell. In one embodiment, a placer (e.g., a software module in the compiler or a separate software application) controls cell density or pin density in different regions of the chip to relieve global congestion. This density control may be done explicitly, or implicitly through padding cells with white space. The placer can either explicitly ensure the original density limits are maintained by inheriting the padding on the SB cells when replacing them with the MB cell. For example, if replacing the SB cells with the MB cell causes the global congestion in the region of the chip (IC) containing the MB cell to degrade below a desired threshold, the compiler may reject the merger.

If the performance threshold is satisfied, the method 300 proceeds to block 340 where the compiler replaces the first cell and the candidate cell(s) with a MB combinational cell in the design. For example, a merging of SB combinational cells is accepted whenever it brings some cost benefit like area reduction or reduced power consumption while preserving (or permitting a small degradation) of other metrics like timing and power.

However, if the performance threshold is not satisfied, the method 300 proceeds to block 335 where the compiler selects a different one of the candidate cells to combine with the first SB cell. The method 300 can proceed to block 315 to then repeat to evaluate this new merger of SB cells.

Although the method 300 describe evaluating combinations between the first combinational cell and one or more candidate cells in an iterative process, in one embodiment, the MB mapping described in method 300 is done globally to identify cells to merge, rather than mapping cells one at a time. In some cases, the one-at-a-time mapping of two or more SB cells to a MB cell may exclude the mapping of other cells that are considered later. This problem can be resolved with a global optimization of all candidate SB cells by creating a Delaunay triangulation graph of the current locations of all candidate cells. The maximum edge cover of this graph yields the maximum set of pairs possible for the design. In one embodiment, the DeLaunay triangulation application performs a global mapping to identify multiple MB combinational cells simultaneously instead of sequentially mapping to one combinational MB cell at a time. Both the graph clustering and the DeLaunay triangulation approaches compute mappings to multiple combinational MB cells simultaneously, instead of doing the mapping one by one which may exclude other mappings from happening altogether. Of course as a sub-case, the system can sequentially apply the mappings identified with these globally optimal methods.

Further, later in the synthesis/compilation process the compiler might have to decompose the MB combinational cells formed using the method in FIG. 3. For example, during the synthesis and place and route flow, the presence of MB cells can significantly constrain the placement, sizing, buffering and may hurt the metrics of interest such as area, timing and power. Thus compiler can use one or more thresholds to determine when the MB cells have a significant constraint on these metrics. In such cases, the MB cells can be broken down (decomposed) to smaller MB cells or SB cells. After decomposing to smaller MB or SB cells, these cells can be placed, and sized for drive strength, and the solution is accepted if it improves the area, power, or timing.

Figure 4:
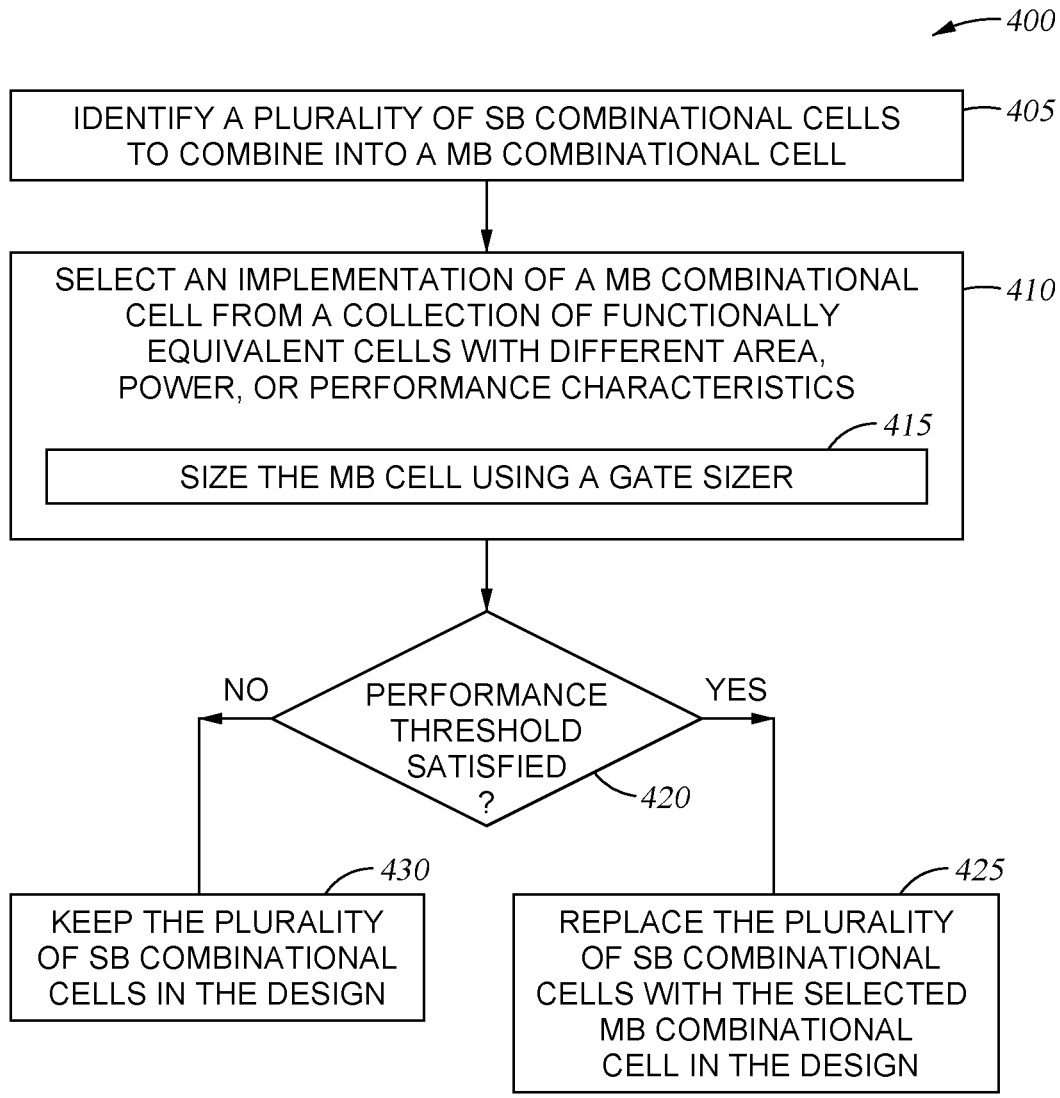
FIG. 4 is a flowchart for optimizing a MB combinational cell formed from at least two SB combinational cells, according to embodiments of the present disclosure.

FIG. 4 is a flowchart of a method 400 for optimizing a MB combinational cell formed from at least two SB combinational cells, according to embodiments of the present disclosure. At block 405, the compiler identifies a plurality of SB combinational cells to combine into a MB combinational cell. The method 400 may be performed before, during, or after the combinational cells in the design have been placed. If placement has been performed, placement information can be used to determine which SB cells to combine, such as the technique illustrated in FIG. 2. However, if placement has not yet occurred then other techniques can be used to identify SB cells that may be good candidates to combine or merge, such as shared inputs, graph clustering, or common buses. These techniques are discussed in more detail in FIG. 3.

At block 410, the compiler selects an implementation of MB combinational cell from a collection of functionally equivalent cells with different area, power, or performance characteristics. For example, a library or database of MB combinational cells may include different cells that are functionally equivalent (e.g., perform the same Boolean logic) but have different sizes, driver strengths, different power consumptions, or are faster. The functionally or logically equivalent MB cells can be expressed as different versions of the same MB cell.

When originally selecting the SB combinational cells for the design, the compiler can select cells optimized for certain environmental conditions in the design such as loading and driver strength. When replacing those SB cells with a MB cell, the compiler can also consider the environmental conditions to select a MB cell with the appropriate area, power, or performance characteristics. For example, the compiler can account for interaction between the MB cell with other modules in a digital implementation flow. In one embodiment, timing or power optimization is performed where the drive strength and voltage threshold (VT) of the MB cell is matched to that of the original SB cells to ensure that the timing is maintained. However, requiring that the candidate SB cells have the same drive strength and VT can limit the cells that can be merged. Therefore, cells with different drive strengths and VTs are optionally allowed to be merged. Once the merging is performed, the compiler attempts to find a drive strength and VT for the new MB cell such that the cost is improved. If no driver strength and VT that leads to cost improvement is found, the cells are not merged.

In one embodiment, at block 415, the compiler can call or use a gate sizer to size the MB cell. The gate sizer may be a software module in the compiler, or could be a different software application. When swapping SB cells for a MB cell, the MB cell might have different characteristics than the SB cells, so the gate size can again evaluate the environmental conditions and choose a version of the MB cells that matches those conditions. For instance, the gate size may want to slow down, or speed up, the signals propagating through the MB cell. The gate sizer may choose a version of the MB cell that has a larger area but also has a stronger electrical drive because it uses a stronger transistor than another version of the MB cell. This might reduce the delay of the MB cell. For example, the drive strength and VT of the MB cell can be adjusted to reflect timing, power, or area considerations. In this manner, the compiler and gate sizer can select between different versions of the same functionally equivalent MB cell to select the version optimized for the environment conditions in the design where the MB cell is placed.

At block 420, the compiler determines whether the performance threshold is satisfied. In addition to evaluating any of the performance thresholds discussed in block 330 of FIG. 3, this performance threshold can be satisfied by changing which version of a MB cell is used. For example, if the MB cell results in too much timing degradation, the compiler can select a different functionally equivalent version of the MB cell that has a smaller delay due to having a stronger electrical drive. Moreover, if the MB cell is too large (e.g., does not provide a sufficiently large benefit to area savings), the compiler may select a smaller version of the MB cell that saves more area, but does not degrade timing beyond an unacceptable amount. Thus, the compiler can perform a similar cost/benefit analysis as described in FIG. 3 and modify the MB cell before determining whether one or more performance thresholds are satisfied.

If the performance threshold is satisfied, the method 400 proceeds to block 425 where the compiler replaces the plurality of SB combinational cells with the selected MB combinational cell in the design. The compiler can use any of the techniques discussed herein to identify a location for the new MB combinational cell.

However, if the compiler cannot identify a version of the MB cell that satisfies the performance threshold, the method 400 proceeds to block 430 where the compiler keeps the plurality of SB combinational cells in the design.

Figure 5:
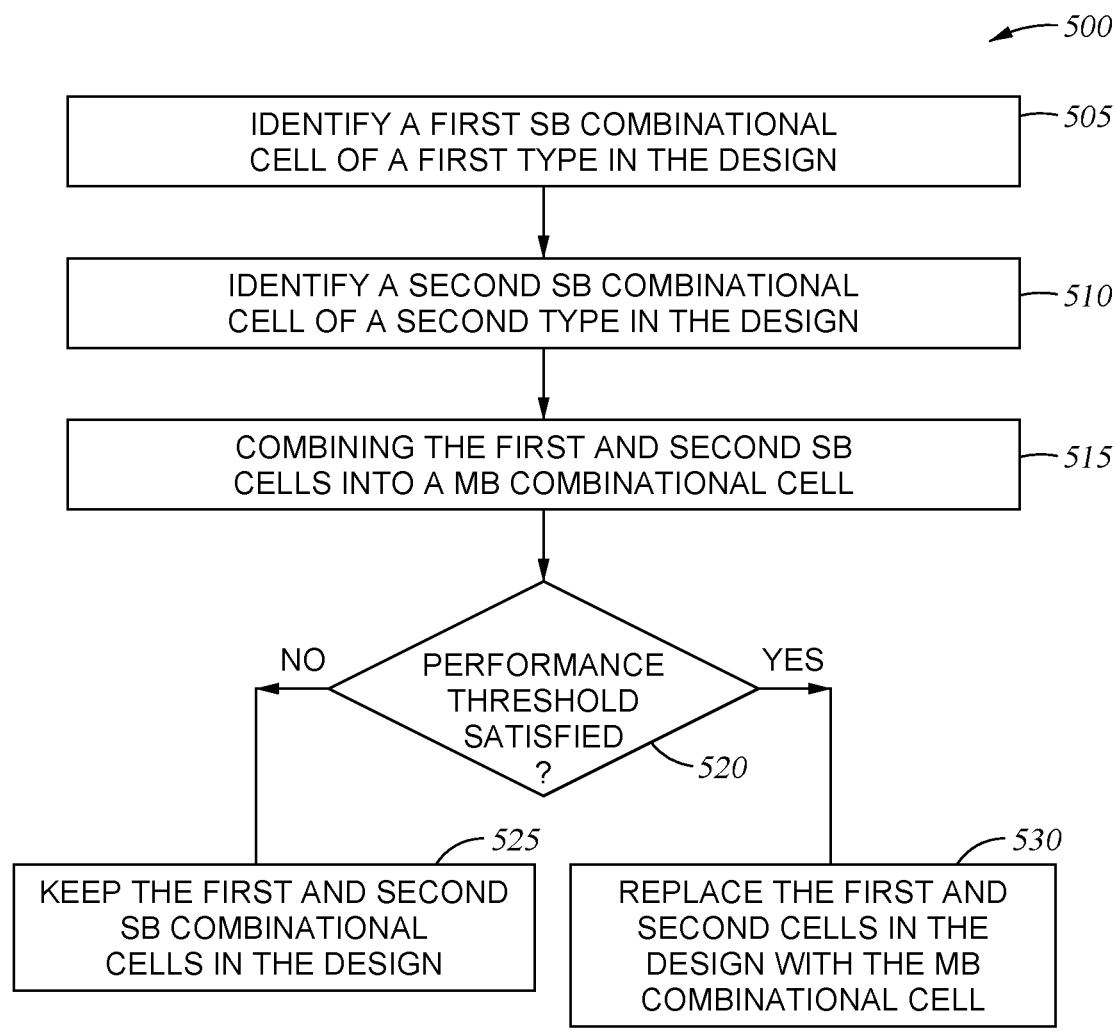
FIG. 5 is a flowchart for combining different types of SB combinational cells, according to embodiments of the present disclosure.

FIG. 5 is a flowchart of a method 500 for combining different types of SB combinational cells, according to embodiments of the present disclosure. At block 505, the compiler identifies a first SB combinational cell of a first type in the design, and at block 510, the compiler identifies a second SB combinational cell of a second type in the design. The first and second SB combinational cells are different types of cells, such as an inverter and a NOR, or a NAND and a NOR. Merging or replacing two different types of SB cells with a single MB cell can result in the performance benefits discussed above when merging SB cells of the same type, such as reducing area and power consumption.

The first and second SB cells can be identified before, during, or after the combinational cells in the design have been placed. If placement has been performed, placement information can be used to determine which SB cells to combine, such as the technique illustrated in FIG. 2. However, if placement has not yet occurred then other techniques can be used such as shared inputs, graph clustering, or common buses can be used to identify different typed SB cells that may be good candidates to combine or merge. These techniques are discussed in more detail in FIG. 3. Thus, in method 500, the candidate SB cells can be cells that are different types, rather than evaluating only SB cells of the same types.

Furthermore, while method 500 describes combining two different types SB cells, the method 500 can also be used to combine the first and second cells with a third SB combinational cell (or more) where the third cell can be the same type as one of the first or second cells, or could be a third type of cell different from the first and second cells.

At block 515, the compiler combines the first and second cells into a MB combinational cell. In one embodiment, the compiler can select one of a plurality of logically or functionally equivalent MB cells (or a particular version of a MB cell) based on environment conditions as discussed in FIG. 4.

At block 520, the compiler determines whether one or performance thresholds are satisfied. The compiler can evaluate any of the performance thresholds discussed in block 330 of FIG. 3 or block 420 in FIG. 4. To do so, the compiler can perform a similar cost/benefit analysis as described in FIG. 3 before determining whether one or more performance thresholds are satisfied.

If the performance threshold is satisfied, the method 500 proceeds to block 530 where the compiler replaces the first and second SB cells in the design with the MB combinational cell. The MB combinational cell performs the same logic (e.g., Boolean logic) as the two different type SB cells but provides benefits such as reduced area in the layout, or reduced power consumption. The MB combinational cell can be placed in the design using any of the techniques discussed above.

However, if the performance threshold is not satisfied, the method 500 proceeds to block 525 where the compiler keeps the first and second SB combinational cells in the design. That is, the SB cells are not merged.

Various features are described herein with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed subject matter or as a limitation on the scope of the claimed subject matter. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

Also, various terms are used herein as used in the art. For example, "optimization", "optimize", and "optimizing" refer, as used in the art and as understood by a person having ordinary skill in the art, to a mathematical formulation of a problem to select some improvement (if an improvement is available), within the structure of the algorithm implemented, of some identified characteristic, and do not imply an absolute or global optimal (as the term is more colloquially used) improvement of the characteristic. For example, in some situations where optimizing may determine a minimum, the minimum may be a local minima rather than the global minimum.

A person having ordinary skill in the art will readily understand various data structures that may be implemented in the processes described herein. For example, a class of mask objects can be defined for polygons and/or edges of polygons of a mask pattern. Similarly, a database or other storage structure can be implemented to store data of a PLT, Jacobian matrix, and/or CFG. Different data structures and/or modified data structures can be used in different examples.

Additionally, a person having ordinary skill in the art will readily understand various modifications to the logical and/or mathematical expressions of examples described herein. For example, different cost functions and/or approximations can be defined and used for calculations. Further, terms such as vector, table, and matrix are generally thought of as mathematical expressions, and related terms, such as column and row, similarly can be organizations within a mathematical expression and can be changed to different organizations. Other examples contemplate such modifications.

Figure 6:
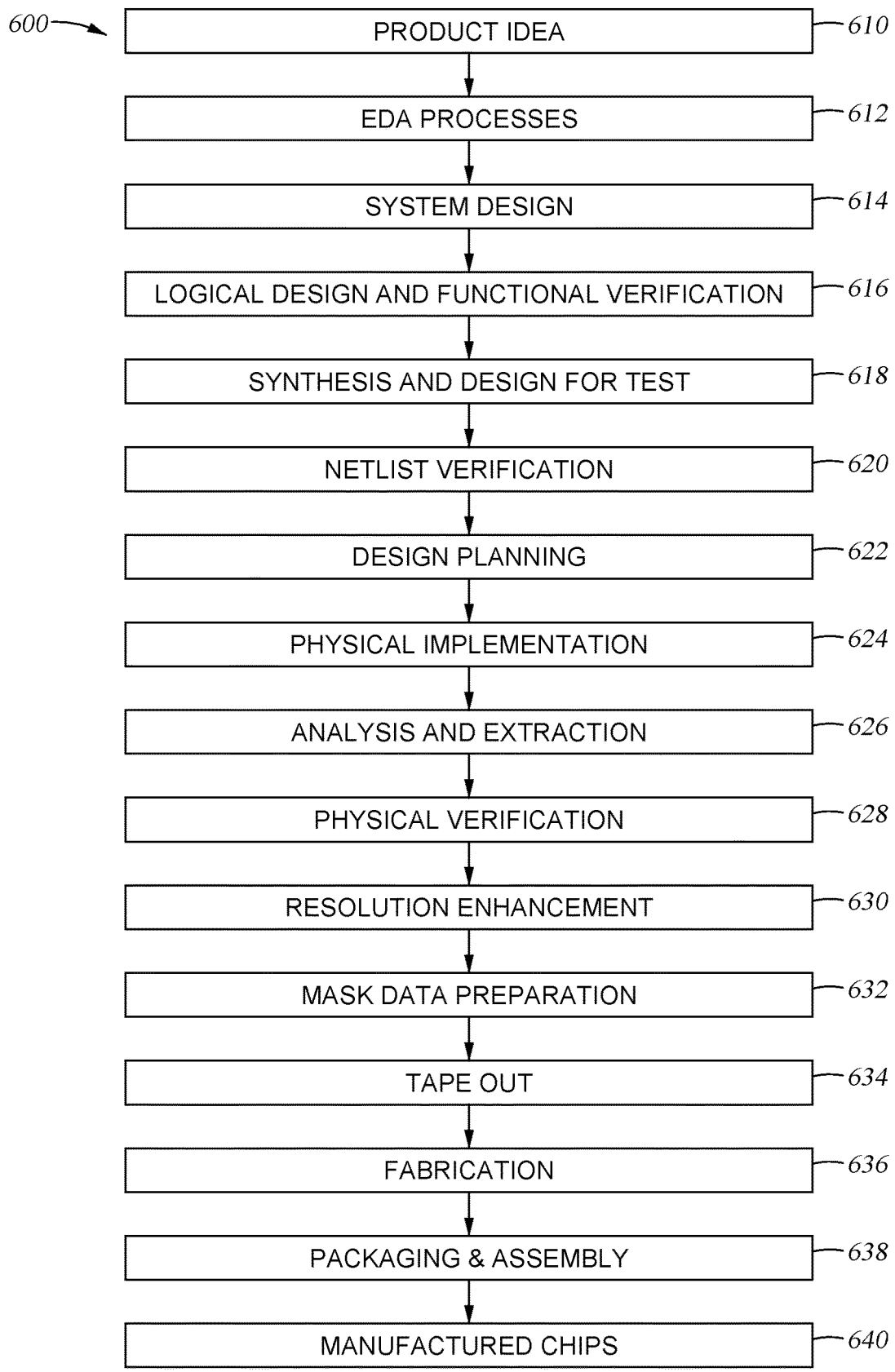
FIG. 6 depicts a flowchart of various processes used during the design and manufacture of an integrated circuit in accordance with some examples of the present disclosure.

FIG. 6 illustrates an example set of processes 600 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at block 610, with the creation of a product idea with information supplied by a designer, information that is transformed to create an integrated circuit that uses a set of EDA processes, at block 612. When the design is finalized, the design is taped-out, at block 634, which is when artwork (e.g., geometric patterns) for the integrated circuit is sent to a fabrication facility to manufacture the mask set, which is then used to manufacture the integrated circuit. After tape-out, at block 636, the integrated circuit is fabricated on a semiconductor die, and at block 638, packaging and assembly processes are performed to produce, at block 640, the finished integrated circuit (oftentimes, also referred to as "chip" or "integrated circuit chip").

Specifications for a circuit or electronic structure may range from low-level transistor material layouts to high-level description languages. A high-level of abstraction may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower abstraction level that is a less abstract description adds more useful detail into the design description, such as, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 6. The processes described may be enabled by EDA products (or tools).

During system design, at block 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at block 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification.

During synthesis and design for test, at block 618, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at block 620, the netlist is checked for compliance with timing constraints and for correspondence with the HDL code. During design planning, at block 622, an overall floor plan for the integrated circuit is constructed and analyzed for timing and top-level routing.

During layout or physical implementation, at block 624, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at block 626, the circuit function is verified at the layout level, which permits refinement of the layout design. During physical verification, at block 628, the layout design is checked to ensure that manufacturing constraints are correct, such as design rule check (DRC) constraints, electrical constraints, lithographic constraints, and that circuitry function matches the HDL design specification. During resolution enhancement, at block 630, the geometry of the layout is transformed to improve how the circuit design is manufactured.

During tape-out, data is created to be used (after lithographic enhancements are applied if appropriate) for production of lithography masks. During mask data preparation, at block 632, the tape-out data is used to produce lithography masks that are used to produce finished integrated circuits.

A storage subsystem of a computer system (such as computer system 800 of FIG. 8, or host system 707 of FIG. 7) may be used to store the programs and data structures that are used by some or all of the EDA products described herein, and products used for development of cells for the library and for physical and logical design that use the library.

Figure 7:
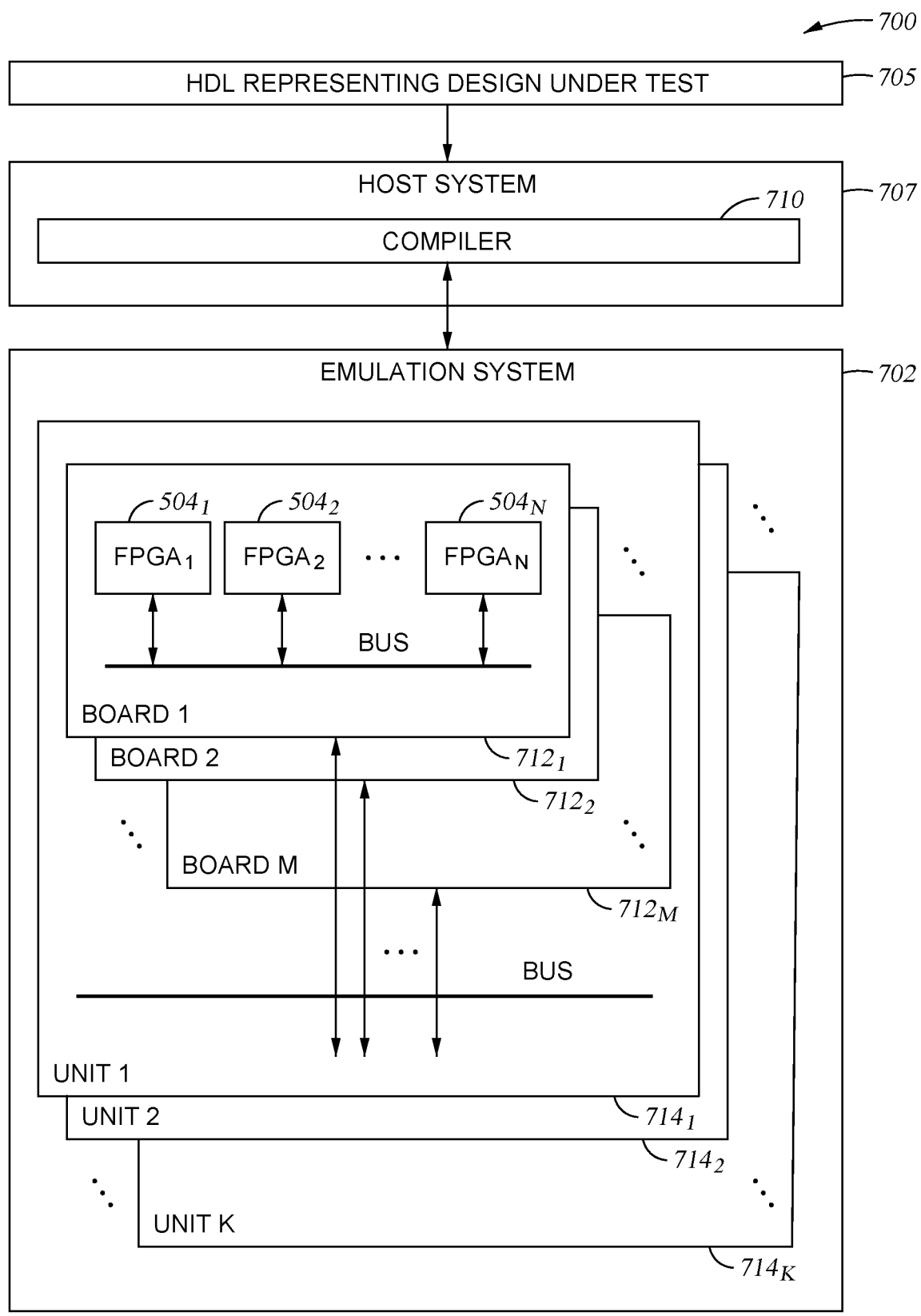
FIG. 7 depicts an abstract diagram of an example emulation system in accordance with some examples of the present disclosure.

FIG. 7 depicts an abstract diagram of an example emulation environment 700. An emulation environment 700 may be configured to verify the functionality of the circuit design. The emulation environment 700 may include a host system 707 (e.g., a computer that is part of an EDA system) and an emulation system 702 (e.g., a set of programmable devices such as Field Programmable Gate Arrays (FPGAs) or processors). The host system generates data and information by using a compiler 710 (e.g., a software application executing on a computing system having at least one processor and memory) to structure the emulation system to emulate a circuit design. A circuit design to be emulated is also referred to as a Design Under Test ('DUT') where data and information from the emulation are used to verify the functionality of the DUT.

The host system 707 may include one or more processors. In the example where the host system includes multiple processors, the functions described herein as being performed by the host system can be distributed among the multiple processors. The host system 707 may include a compiler 710 to transform specifications written in a description language that represents a DUT and to produce data (e.g., binary data) and information that is used to structure the emulation system 702 to emulate the DUT. The compiler 710 can transform, change, restructure, add new functions to, and/or control the timing of the DUT.

The host system 707 and emulation system 702 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 707 and emulation system 702 can exchange data and information through a third device such as a network server.

The emulation system 702 includes multiple FPGAs (or other modules) such as FPGAs $704_1$ and $704_2$ as well as additional FPGAs to $704_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, examples of emulators can include other types of logic blocks instead of, or along with, the FPGAs for emulating DUTs. For example, the emulation system 702 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some examples, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $704_1$ through $704_N$ may be placed onto one or more boards $712_1$ and $712_2$ as well as additional boards through $712_M$. Multiple boards can be placed into an emulation unit $714_1$. The boards within an emulation unit can be connected using the backplane of the emulation unit or any other types of connections. In addition, multiple emulation units (e.g., $714_1$ and $714_2$ through $714_K$) can be connected to each other by cables or any other means to form a multi-emulation unit system.

For a DUT that is to be emulated, the host system 300 transmits one or more bit files to the emulation system 702. The bit files may specify a description of the DUT and may further specify partitions of the DUT created by the host system 707 with trace and injection logic, mappings of the partitions to the FPGAs of the emulator, and design constraints. Using the bit files, the emulator structures the FPGAs to perform the functions of the DUT. In some examples, one or more FPGAs of the emulators may have the trace and injection logic built into the silicon of the FPGA. In such an example, the FPGAs may not be structured by the host system to emulate trace and injection logic.

The host system 707 receives a description of a DUT that is to be emulated. In some examples, the DUT description is in a description language (e.g., a register transfer language (RTL)). In some examples, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some examples, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 707 and/or the compiler 710 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 705 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some examples, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 8:
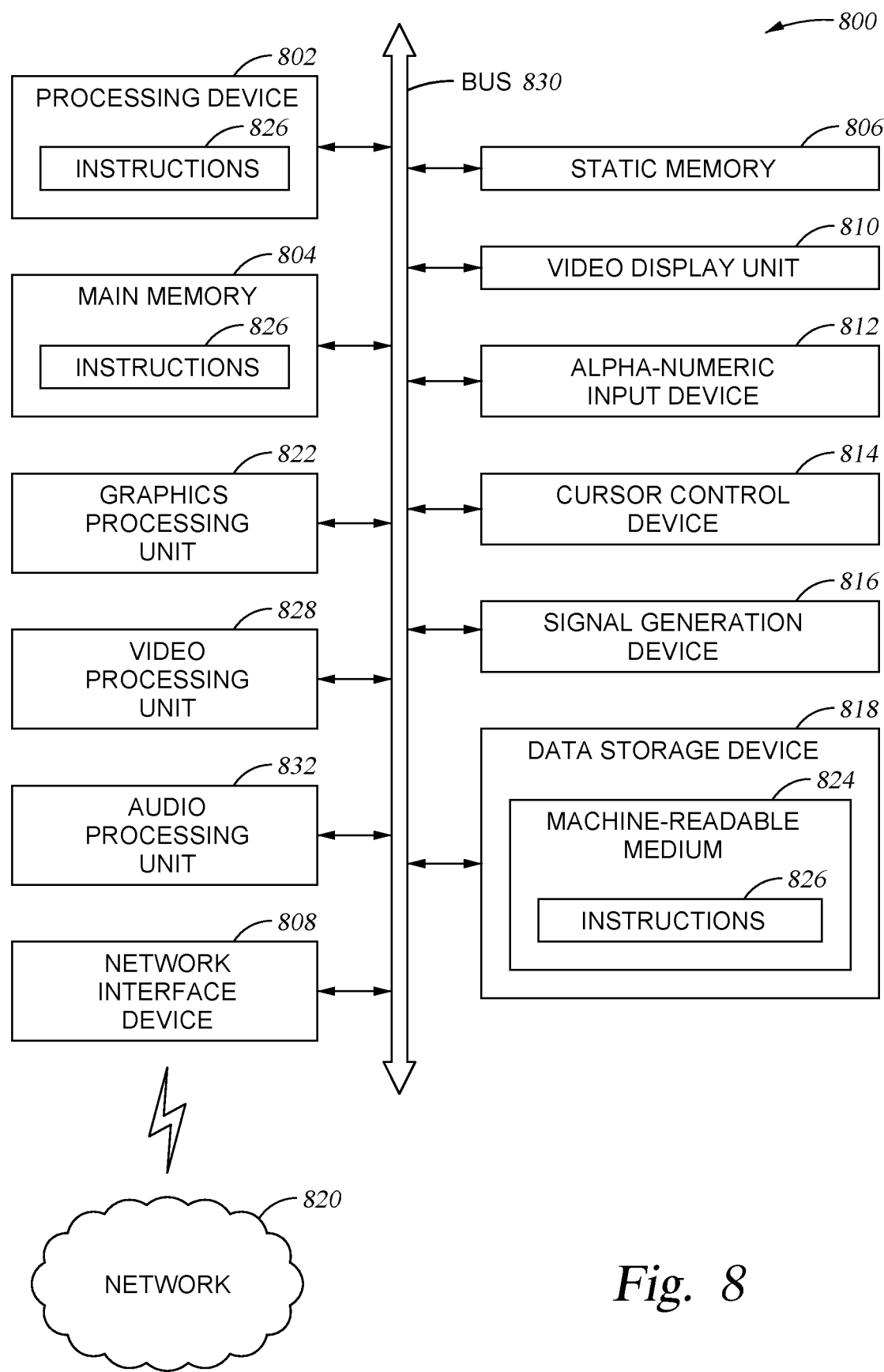
FIG. 8 depicts an abstract diagram of an example computer system in which examples of the present disclosure may operate.

FIG. 8 illustrates an example of a computer system 800 within which a set of instructions, for causing the computer system to perform any one or more of the methodologies discussed herein, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830. The main memory 804 includes or is a non-transitory computer readable medium. The main memory 804 (e.g., a non-transitory computer readable medium) can store one or more sets of instructions 826, that when executed by the processing device 802, cause the processing device 802 to perform some or all of the operations, steps, methods, and processes described herein.

Processing device 802 represents one or more processors such as a microprocessor, a central processing unit, or the like. More particularly, the processing device 802 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing some or all of the operations, steps, methods, and processes described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (e.g., a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also including machine-readable storage media.

In some implementations, the instructions 826 include instructions to implement functionality described above. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 802 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium comprising stored instructions, which when executed by a processor, cause the processor to perform an operation, the operation comprising:
   identifying a first single-bit (SB) combinational cell in a design for an integrated circuit;
   identifying a plurality of candidate SB combinational cells to combine with the first SB combinational cell using a first criterion;
   combining the first SB combinational cell with at least one of the plurality of candidate SB combinational cells to form a multi-bit (MB) combinational cell; and
   upon determining the MB combinational cell satisfies a performance threshold, replacing the first SB combinational cell and the at least one of the plurality of candidate SB combinational cells with the MB combinational cell in the design.

2. The non-transitory computer readable medium of claim 1, wherein identifying the plurality of candidate SB combinational cells comprises:
   determining that each of the plurality of candidate SB combinational cells is within a first distance from the first SB combinational cell in a placement of the design, wherein the first distance corresponds to a search window centered at the first SB combinational cell.

3. The non-transitory computer readable medium of claim 1, wherein identifying the plurality of candidate SB combinational cells comprises:
   determining that each of the plurality of candidate SB combinational cells has a shared input signal with the first SB combinational cell.

4. The non-transitory computer readable medium of claim 1, wherein identifying the plurality of candidate SB combinational cells is based on graph clustering where SB combinational cells within the same cluster as the first SB combinational cell form the plurality of candidate SB combinational cells.

5. The non-transitory computer readable medium of claim 1, wherein determining the MB combinational cell satisfies the performance threshold is based on whether global congestion in a region of the integrated circuit containing the MB combinational cell is degraded when replacing the first SB combinational cell and the at least one of the plurality of candidate SB combinational cells with the MB combinational cell in the design.

6. The non-transitory computer readable medium of claim 1, wherein identifying the plurality of candidate SB combinational cells comprises:
   determining that each of the plurality of candidate SB combinational cells is on a same signal bus as the first SB combinational cell.

7. The non-transitory computer readable medium of claim 1, wherein the operation further comprises, before replacing the first SB combinational cell and the at least one of the plurality of candidate SB combinational cells with the MB combinational cell:
   sizing the MB combinational cell; and
   adjusting a drive strength and threshold-voltage of the MB combinational cell.

8. The non-transitory computer readable medium of claim 1, wherein the performance threshold corresponds to a threshold related to at least one of area, power, or timing corresponding to the MB combinational cell.

9. The non-transitory computer readable medium of claim 1, wherein the first SB combinational cell and the at least one of the plurality of candidate SB combinational cells are a same type of SB combinational cell.

10. The non-transitory computer readable medium of claim 1, wherein the first SB combinational cell and the at least one of the plurality of candidate SB combinational cells are different types of SB combinational cell.

11. The non-transitory computer readable medium of claim 1, wherein the operation further comprises after replacing the first SB combinational cell and the at least one of the plurality of candidate SB combinational cells with the MB combinational cell:
   upon identifying the MB combinational cell has a significant constraint on synthesizing the design according to a threshold, decomposing the MB combinational cell to determine whether doing so improves the design.

12. The non-transitory computer readable medium of claim 1, wherein the operation further comprises, before replacing the first SB combinational cell and the at least one of the plurality of candidate SB combinational cells with the MB combinational cell:

adding an unused SB combinational cell to the MB combinational cell to serve as a spare cell, wherein the MB combinational cell, after being placed, comprises the first SB combinational cell, the at least one of the plurality of candidate SB combinational cells, and the unused SB combinational cell.

13. The non-transitory computer readable medium of claim 12, wherein the operation further comprises, after replacing the first SB combinational cell and the at least one of the plurality of candidate SB combinational cells with the MB combinational cell:

assigning the spare cell in the MB combinational cell to perform a logical function in the design in response to an engineering change order (ECO).

14. A system comprising:

a memory storing instructions; and a processor, coupled with the memory and to execute the instructions, the instructions when executed cause the processor to perform an operation, the operation comprising:

identifying a plurality of candidate single-bit (SB) combinational cells to combine into a multi-bit (MB) combinational cell in a design for an integrated circuit;

selecting, based on environmental conditions in the design, an implementation of the MB combinational cell from a collection of functionally equivalent MB cells with different area, power, or performance characteristics; and upon determining that the selected implementation of the MB combinational cell satisfies a performance threshold, replacing the plurality of SB combinational cells with the selected implementation of the combinational MB cell.

15. The system of claim 14, wherein the functionally equivalent MB cells all perform the same Boolean logic.

16. The system of claim 14, wherein the performance threshold corresponds to a threshold related to at least one of area, power, or timing corresponding to the MB combinational cell.

17. The system of claim 14, wherein the operation further comprises, before replacing the plurality of SB combinational cells with the selected implementation of the combinational MB cell:

adding an unused SB combinational cell to the MB combinational cell to serve as a spare cell, wherein the MB combinational cell, after being placed, comprises the plurality of SB candidate combinational cells and the unused SB combinational cell.

18. A method comprising:

identifying a first single-bit (SB) combinational cell in a design for an integrated circuit, wherein the first SB combinational cell is a first type of combinational cell;

identifying a second SB combinational cell in the design, wherein the second SB combinational cell is a second type of combinational cell;

combining the first and second SB combinational cells to form a multi-bit (MB) combinational cell; and upon determining the MB combinational cell satisfies a performance threshold, replacing the first and second SB combinational cells with the MB combinational cell in the design.

19. The method of claim 18, wherein the first and second SB combinational cells perform different Boolean logic.

20. The method of claim 18, wherein the performance threshold corresponds to a threshold related to at least one of area, power, or timing corresponding to the MB combinational cell.

\* \* \* \* \*